(12) United States Patent
Tsuboi

(10) Patent No.: US 6,484,522 B2
(45) Date of Patent: Nov. 26, 2002

(54) SCREW COMPRESSOR FOR REFRIGERATING APPARATUS

(75) Inventor: Noboru Tsuboi, Hyogo (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 09/884,016

(22) Filed: Jun. 20, 2001

(65) Prior Publication Data

US 2001/0054294 A1 Dec. 27, 2001

(30) Foreign Application Priority Data

Jun. 23, 2000 (JP) ........................................ 2000-189537

(51) Int. Cl.[7] .............................. F25B 1/047; F25B 49/02
(52) U.S. Cl. ........................................ 62/209; 62/228.4
(58) Field of Search ................................ 62/228.4, 208, 62/209, 227, 230

(56) References Cited

U.S. PATENT DOCUMENTS

| | | | | |
|---|---|---|---|---|
| 4,506,518 A | * | 3/1985 | Yoshikawa et al. | 251/129.11 |
| 4,663,942 A | * | 5/1987 | Kanazawa | 318/806 |
| 4,667,480 A | * | 5/1987 | Bessler | 318/254 |
| 4,722,196 A | * | 2/1988 | Ishikawa | 62/193 |
| 5,036,676 A | * | 8/1991 | Dudley | 62/115 |
| 5,058,390 A | * | 10/1991 | Sindermann et al. | 62/181 |
| 5,150,584 A | * | 9/1992 | Tomasov et al. | 62/126 |

FOREIGN PATENT DOCUMENTS

| | | |
|---|---|---|
| JP | 57-18484 | 1/1982 |
| JP | 59-211790 | 11/1984 |
| JP | 2-176175 | 7/1990 |
| JP | 8-58357 | 3/1996 |

* cited by examiner

*Primary Examiner*—William E. Tapolcai
(74) *Attorney, Agent, or Firm*—Oblon, Spivak, McClelland, Maier & Neustadt, P.C.

(57) ABSTRACT

The present invention provides a screw compressor for refrigerating apparatus capable of controlling the rotational speed of a motor to be suitable for cooling heat load by simply controlling an inverter, without causing the overload of the motor.

The screw compressor 1A for refrigerating apparatus 10A, which uses a motor 22 controlled by an inverter, as a driving portion, is provided with a suction pressure detector D3 as a heat load detecting means for detecting the cooling heat load; a motor coil temperature detector D1 as a means for detecting the load condition of the motor 22; and a controller 26 that decreases the rotational speed of the motor 22 if the capacity of the compressor is determined as excessive based on a pressure signal from the detector D3, maintains the rotational speed if the capacity is determined neither excessive nor lacking. In case that the capacity is determined as lacking, the controller 26 reduces the rotational speed if the load condition is determined as excessive based on a temperature signal from the detector D1 and increases the rotational speed in the other case.

11 Claims, 16 Drawing Sheets

F I G. 16
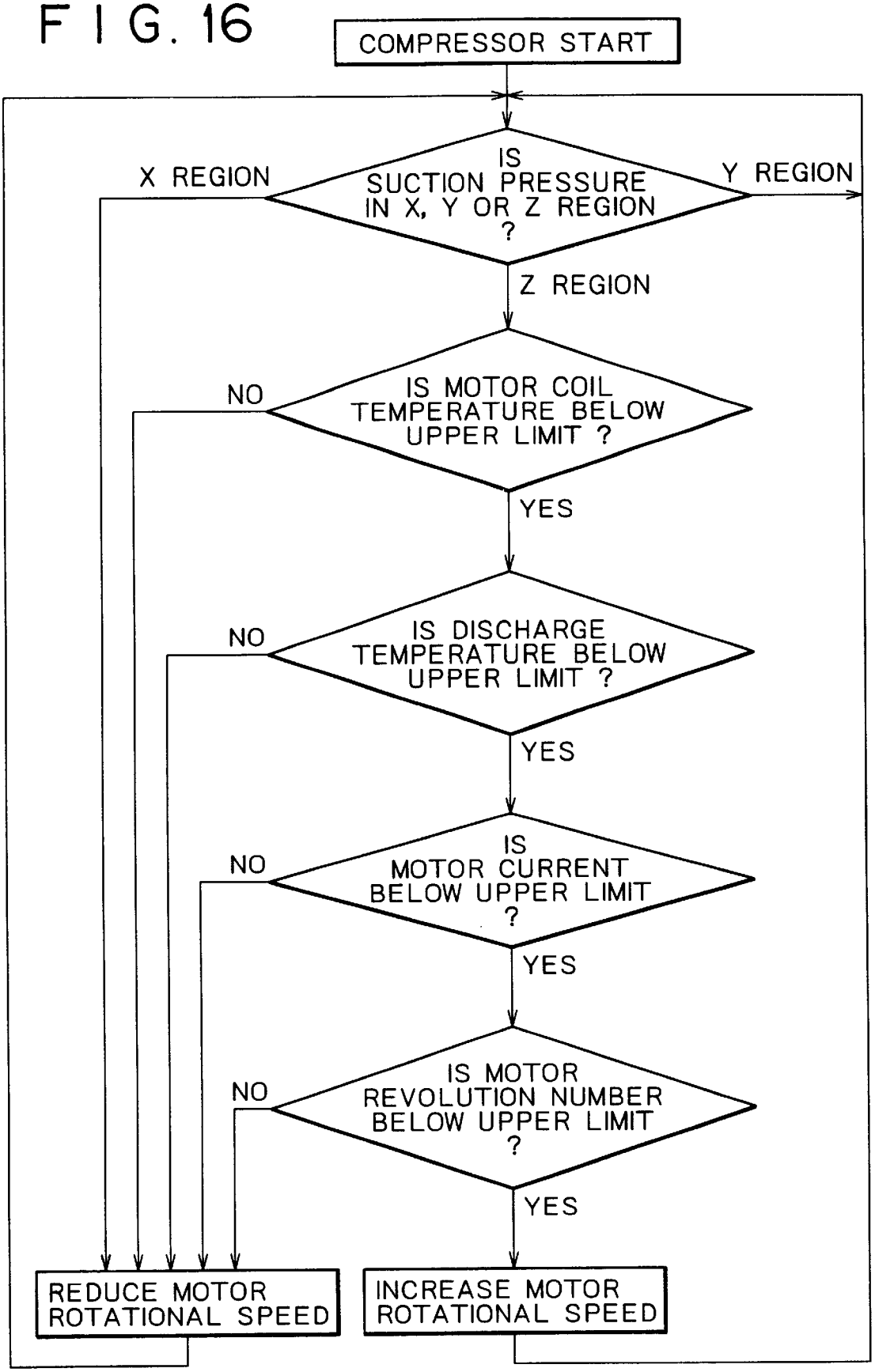

SCREW COMPRESSOR FOR REFRIGERATING APPARATUS

BACKGROUND OF THE INVENTION

1. Field of the Invention

The present invention relates to a screw compressor for refrigerating apparatus that is driven by a motor being controlled by an inverter.

2. Description of the Related Art

Conventionally, a screw compressor for refrigerating apparatus adapted to control the rotational speed of each of motors for driving the compressor body and the liquid injection pump according to the increase and the decrease of load is known in Japanese Patent Laid-Open Publication No. Sho 57-18484. This screw compressor has a suction pressure detector for detecting the suction pressure in its suction section, which pressure has a monotone increasing relationship with the cooling heat load, wherein a pressure signal outputted from the suction pressure detector is inputted to a variable voltage frequency converter via a pressure regulator, so that rotational speeds of a compressor body driving motor and a liquid injection pump driving motor are controlled simultaneously.

In addition, a screw compressor for refrigerating apparatus which is aimed at the improvement of efficiency in a low partial load region by adding a capacity control system using an inverter to a stepless capacity control mechanism by a slide valve is disclosed in Japanese Patent Laid-Open Publication No. Sho 59-211790.

The above-mentioned screw compressor disclosed in Japanese Patent Laid-Open Publication No. Sho 57-18484 is controlled to increase the rotational speed of motor when the pressure detected by the suction pressure detector is higher than the predetermined value of pressure. Therefore, there is a problem in that the motor is apt to be overloaded, so that the endurance of the motor is deteriorated.

Furthermore, the screw compressor disclosed in Japanese Patent Laid-Open Publication No. Sho 59-211790 has a complicated construction because the slide valve is provided. Furthermore, the screw compressor is constructed so that the inverter is not used, i.e., a commercial power source is directly used without intervening the inverter, when the capacity of this screw compressor is in the range of 100 to 75% by the slide valve, whereby there is a problem in that the inverter is not sufficiently used.

SUMMARY OF THE INVENTION

In view of above problems, it is an object of the present invention to provide a screw compressor for refrigerating apparatus capable of controlling the rotational speed of a motor to be suitable for cooling heat load by an online power system using an inverter, without causing overload of the motor.

To solve the above problem, the present invention provides a screw compressor for refrigerating apparatus comprising: a screw rotor; a motor for driving said screw rotor, the rotational speed of said motor being controlled through an inverter; a heat load detecting means for detecting a cooling heat load; a load condition detecting means for detecting the heat load condition of said motor; and a motor rotational speed controlling device for controlling the rotational speed of said motor based on a heat load signal from said heat load detecting means and a load condition signal from said load condition detecting means.

Here, said motor rotational speed controlling device can be configured to control the rotational speed of said motor to be reduced if the compressor capacity is determined as excessive based on said heat load signal or if the load condition of said motor is determined as excessive based on said load condition signal, and to control the rotational speed of said motor to be increased if the compressor capacity is determined as lacking based on said heat load signal and the load condition of said motor is determined as not excessive based on said load condition signal.

As said head load detecting means, either a detector for detecting the suction pressure of said screw compressor or a detector for detecting the temperature of cooled liquid, emanated from an evaporator in said refrigerating apparatus can be used.

As said load condition detecting means, a detector for detecting the coil temperature of said motor, a detector for detecting the electric current that is supplied to said motor, a detector for detecting the temperature of refrigerant gas that is discharged from said screw compressor, a detector for detecting the rotational speed of said motor and the like can be used.

It is possible to provide a plurality of said load condition detecting means to perform the control of rotational speed of said motor based on a plurality of said load condition signals.

According to the present invention, it becomes possible to control the corresponding rotational speed of the motor to be suitable for the cooling heat load without causing the overload of motor. As a result, the improvement of motor endurance and the reduction of consuming power can be realized. Furthermore, above advantages are accomplished by always using the inverter and not using a slide valve.

BRIEF DESCRIPTION OF THE DRAWINGS.

FIG. 16 is a flow chart illustrating the control of the screw compressor in the refrigerating apparatus shown in FIG. 15.

DESCRIPTION OF THE PREFERRED EMBODIMENT

Now, embodiments of the present invention will be explained with reference to the drawings.

Figure 1:
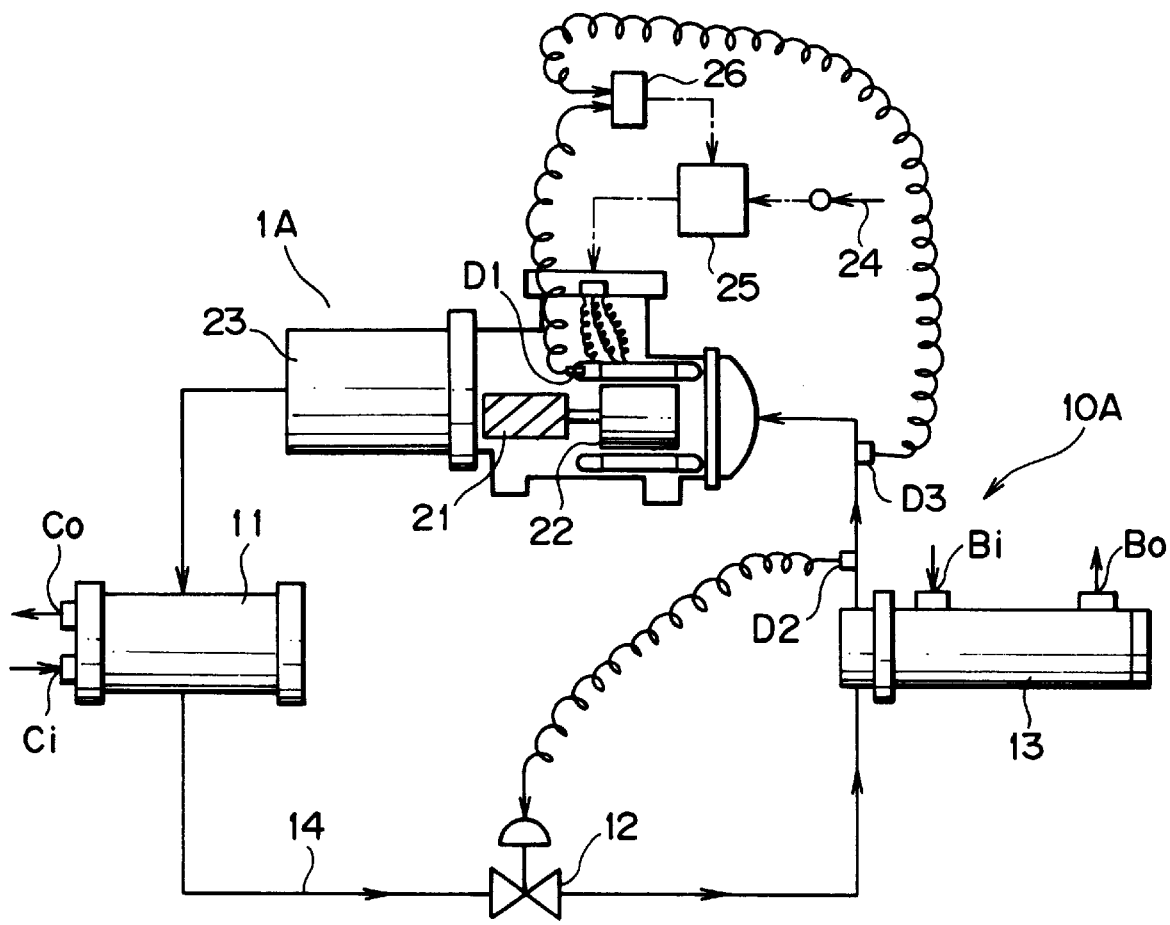
FIG. 1 schematically shows a refrigerating apparatus incorporating a screw compressor according to the present invention.

FIG. 1 illustrates a refrigerating apparatus 10A incorporating a screw compressor 1A according to the present invention, in which a circulation flow path 14 is formed for flowing the refrigerant through the screw compressor 1A, a condenser 11, an expansion valve 12 and an evaporator 13.

The screw compressor 1A comprises a pair of engaging male and female screw rotors 21, a motor 22 for rotating the screw rotors 21, a discharging portion 23 and a motor coil temperature detector D1, wherein the motor 22 is adapted to be operated by a power supplied from a power source supplying line 24 via an inverter 25. The condenser 11 is provided with a cooling water inlet Ci and a cooling water outlet Co and the evaporator 13 is provided with a cooled liquid inlet Bi and a cooled liquid outlet Bo. Furthermore, in the secondary side of the evaporator 13 in connection with the circulation flow path 14, an superheat degree detector D2 for detecting the superheat degree of refrigerant gas emanated from the evaporator 13 is provided, so that the opening extent of the expansion valve 12 is controlled according to the detected superheat degree. And, in the secondary side of the evaporator 13, a suction pressure detector D3 for detecting the suction pressure of the screw compressor 1A is provided, so that a pressure signal indicating the detected pressure is inputted from this suction pressure detector D3 into a controller 26 and simultaneously, a temperature signal indicating the detected temperature is inputted from a motor coil temperature detector D1 into the controller 26. Herein, the suction pressure is a factor indicating the cooling heat load of the refrigerating apparatus 10A and the motor coil temperature is a factor indicating the load condition of the motor 22. And based on both of these signals, frequency conversion of power is performed in the inverter 25 and the motor 22 is controlled as explained later.

Figure 2:
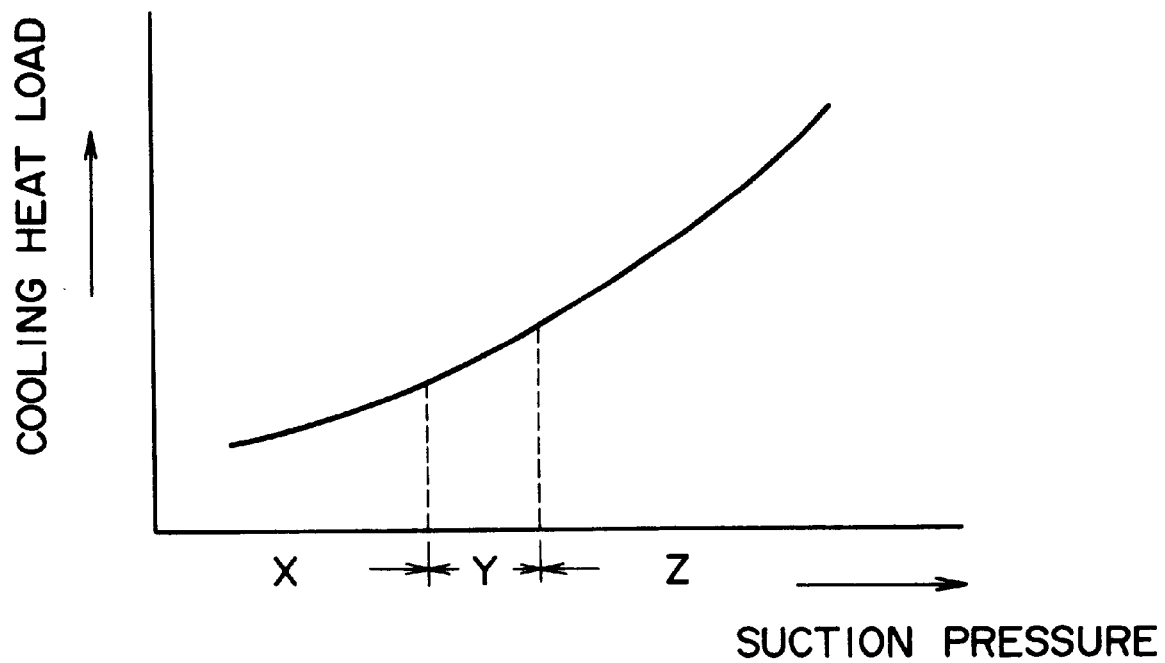
FIG. 2 shows a relationship between the suction pressure and the cooling heat load of the screw compressor in the refrigerating apparatus shown in FIG. 1.

However, as shown in FIG. 2, the suction pressure of the screw compressor 1A and the cooling heat load of the refrigerating apparatus 10A have a relationship of wherein and the cooling heat load increases as the suction pressure increases. And, if the suction pressure is too low, the cooling heat load is so small that the capacity of the screw compressor 1A becomes excessive, and thus it is necessary to reduce the consumption power by reducing the rotational speed of the motor 22 to reduce the capacity of the screw compressor 1A. In contrast, if the suction pressure is too high, it is needed to increase the capacity of the screw compressor 1A by increasing the rotational speed of the motor 22, because the capacity of the screw compressor 1A becomes lacking due to the increased cooling heat load. Therefore, it is possible to predetermine X region in which the suction pressure is too low, Z region in which the suction pressure is too high, and Y region in which the suction pressure is neither high nor low and thus the rotational speed of the motor 22 does not need to be changed, and boundary values of each region is previously set in the controller 26.

Next, the control of the motor 22 of the above-mentioned refrigerating apparatus 10A that is in working will be described with reference to FIG. 3.

Firstly, if the screw compressor 1A is started and thus the refrigerating apparatus 10A becomes to the working condition, determination as to where a suction pressure belongs among the above-mentioned X, Y and Z regions in the controller is made in the first step; if it belongs to X region, the process passes to a step for reducing the rotational speed of the motor 22, and if it belongs to Y region, it is not needed to change the rotational speed of the motor 22 and thus the process is returned to the first step while maintaining the rotational speed. Meanwhile, if the suction pressure belongs to Z region, it is needed to increase the capacity of the screw compressor 1A by increasing the rotational speed of the motor 22, but if the rotational speed of the motor 1A is excessively increased, the motor 22 becomes to an overload condition and the overload condition should be avoided.

Accordingly, if the suction pressure belongs to Z region, the process passes to a step for determining whether the motor coil temperature is below the predetermined upper limit value (YES) or not (NO) and this determination is made in the controller 26. If YES, the process passes to a step for increasing the rotational speed of the motor 22 and a signal increasing frequency of power for the inverter 25 is outputted from the controller 26, so that the rotational speed of the motor 22 will be increased. Whereas, if NO, the process passes to a step for reducing the rotational speed of the motor 22 and a signal for reducing the frequency of power outputted from the controller 26 to the inverter 25, thus the rotational speed of the motor 22 is decreased even if the suction pressure is in Z region, because the motor 22 is considered as being in the overload condition. After passing through these steps for changing the rotational speed of the motor 22, all of the cases are returned to the first step and each of the above-mentioned steps is repeated.

In this way, the capacity of the screw compressor 1A is regulated in response to the change of cooling heat load, without causing the overload of the motor 22.

Figure 4:
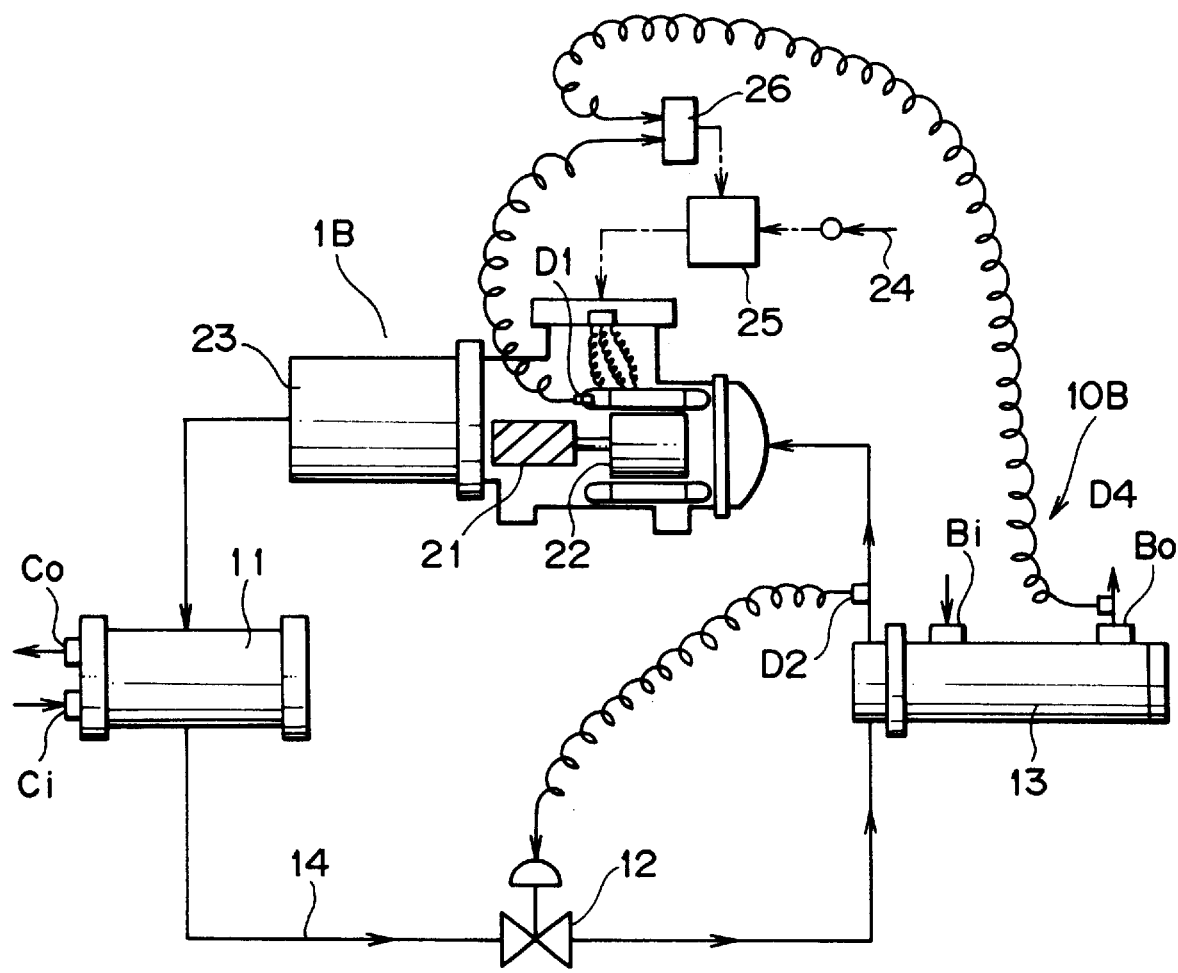
FIG. 4 schematically shows a refrigerating apparatus incorporating another screw compressor according to the present invention.

FIG. 4 shows a refrigerating apparatus 10B using another screw compressor 1B according to the present invention, in which drawing the constituents of the refrigerating apparatus common to those of the refrigerating apparatus 10A shown in FIG. 1 are indicated with same reference numerals and descriptions thereof will be omitted.

In this refrigerating apparatus 10B, a cooled liquid temperature detector D4 is provided in the flow path for cooled liquid emanated from the evaporator 13, instead of the suction pressure detector D3 shown in FIG. 1, so that a temperature signal indicating the detected temperature is inputted from the cooled liquid temperature detector D4 into the controller 26.

As explained in the above, the temperature of the cooled liquid has monotone increasing relationship with the cooling heat load, and this cooling heat load is resulted from the cooled liquid outlet Bo of the evaporator 13 or the lower side thereof. Therefore, the refrigerating apparatus 10B shown in FIG. 4 is substantially identical to the refrigerating apparatus 10A shown in FIG. 1, so that it is possible to make determination as to where a suction pressure belongs among the X, Y and Z regions based on the temperature signal from the cooled liquid temperature detector D4, and the flow chart shown in FIG. 3 can be correspondingly applied to the refrigerating apparatus 10B shown in FIG. 4.

Figure 5:
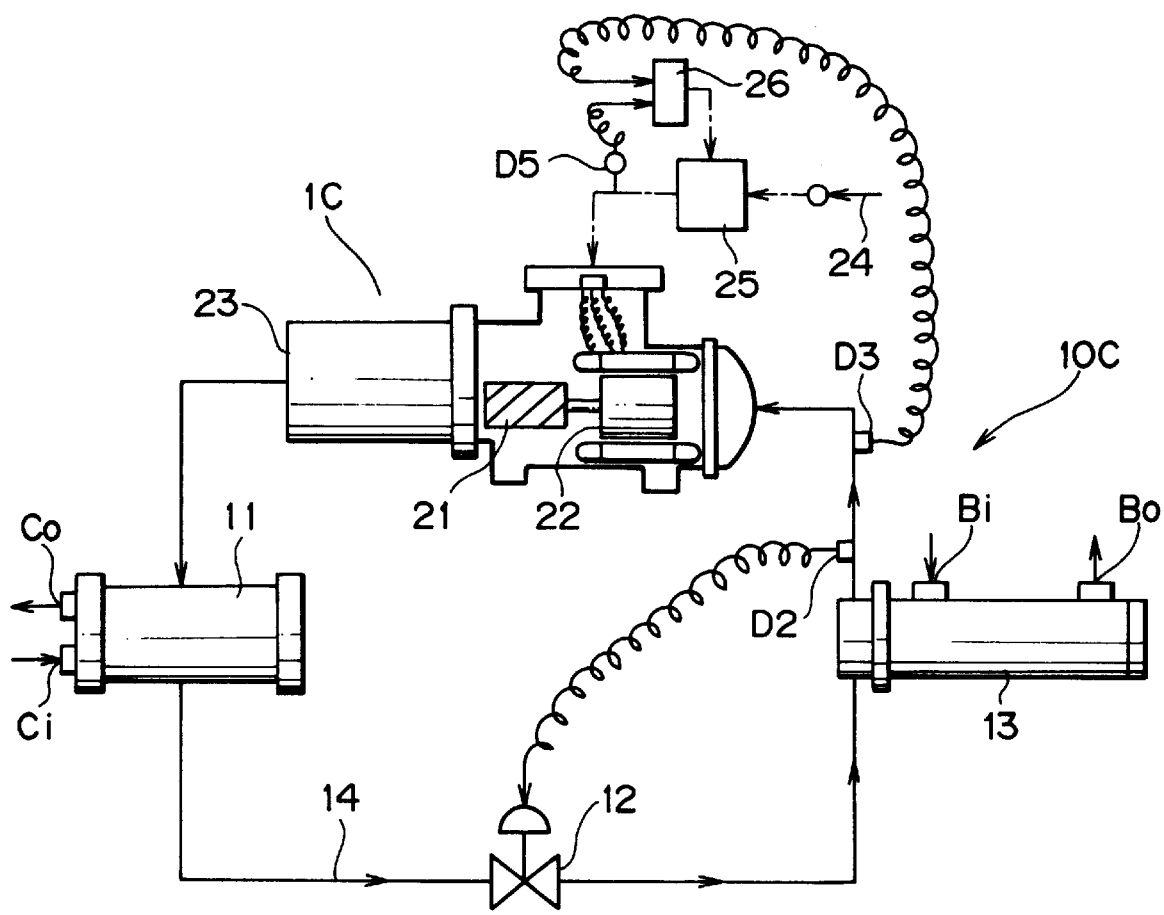
FIG. 5 schematically shows a refrigerating apparatus incorporating still another screw compressor according to the present invention.

FIG. 5 shows a refrigerating apparatus 10C incorporating still another screw compressor 1C according to the present invention, in which drawing the constituents common to those of the refrigerating apparatus 10A shown in FIG. 1 are indicated with same reference numerals and descriptions thereof will be omitted.

The refrigerating apparatus 10C is provided with a current detector D5 for detecting the magnitude of motor current of the power supplied to the motor 22 instead of the motor coil temperature detector D1 shown in FIG. 1, so that a current signal indicating the detected current is inputted from the current detector D5 into the controller 26.

Figure 3:
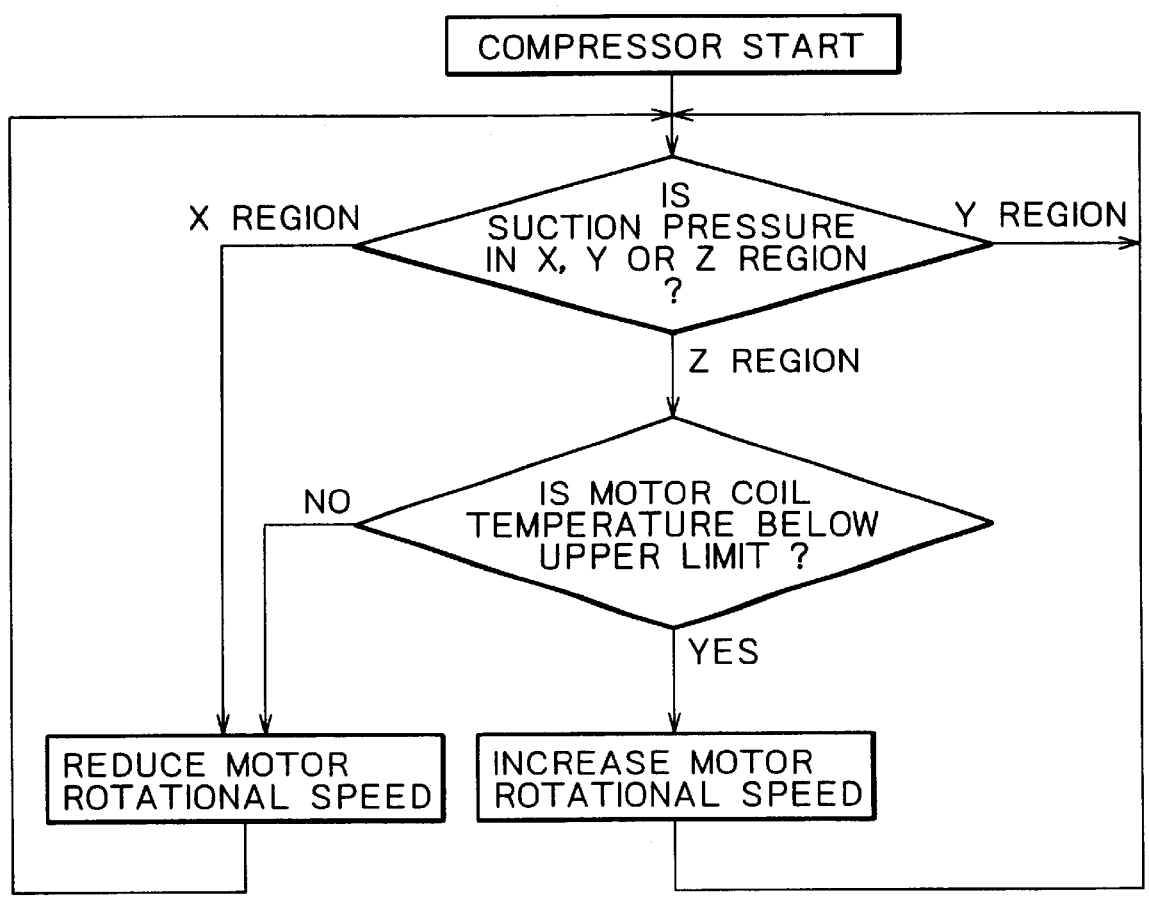
FIG. 3 is a flow chart illustrating the control of the screw compressor in the refrigerating apparatus shown in FIG. 1.
Figure 6:
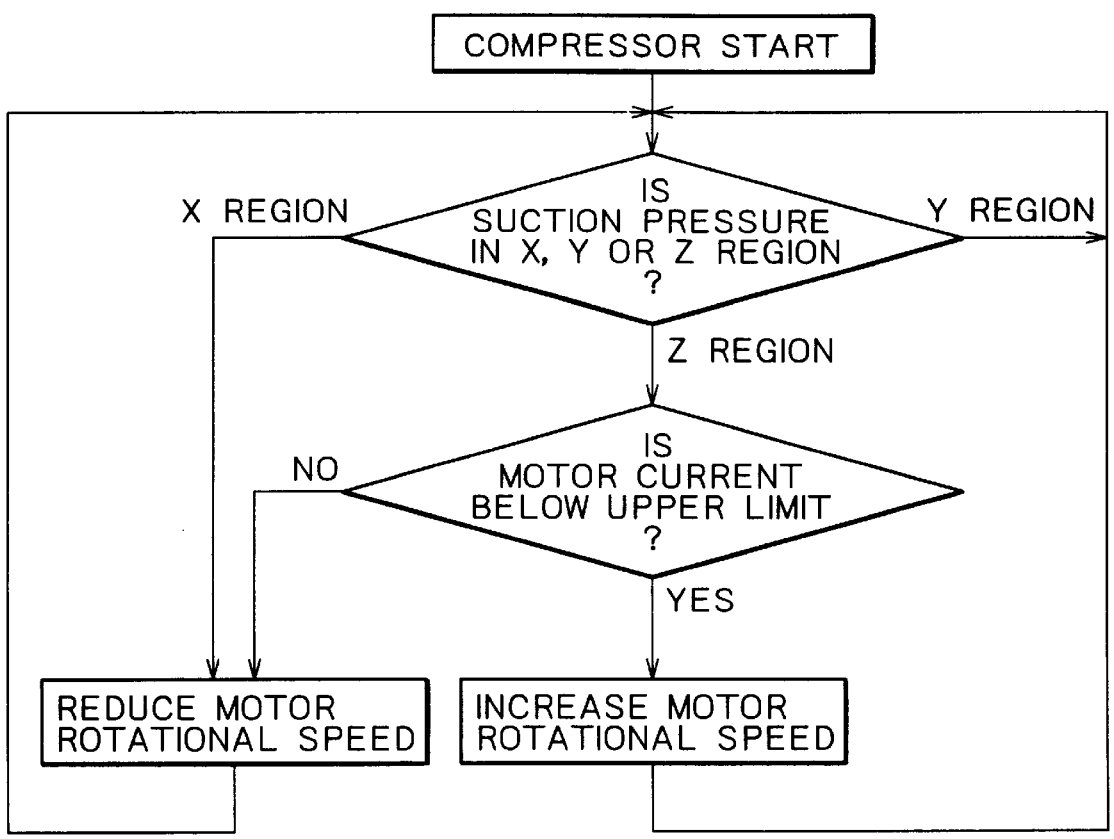
FIG. 6 is a flow chart illustrating the control of the screw compressor in the refrigerating apparatus shown in FIG. 5.

And, in this refrigerating apparatus 10C, as shown in FIG. 6, a control is performed in which a step for determining whether the motor current is below the predetermined upper limit value (YES) or not (NO) is included instead of the step for determining whether the motor coil temperature is below the predetermined upper limit value or not as shown in FIG. 3. Namely, if the motor current is below the upper limit value (YES), it passes to the step for increasing the rotational speed of the motor, because the motor 22 is considered as not in the overload condition. If the motor current is not below the upper limit value (NO), it passes to the step for reducing the rotational speed of the motor, because the motor 22 is considered as in the overload condition.

This control is substantially identical to that shown in FIG. 3, except that the overload condition of the motor 22 is determined based on the motor current.

Figure 7:
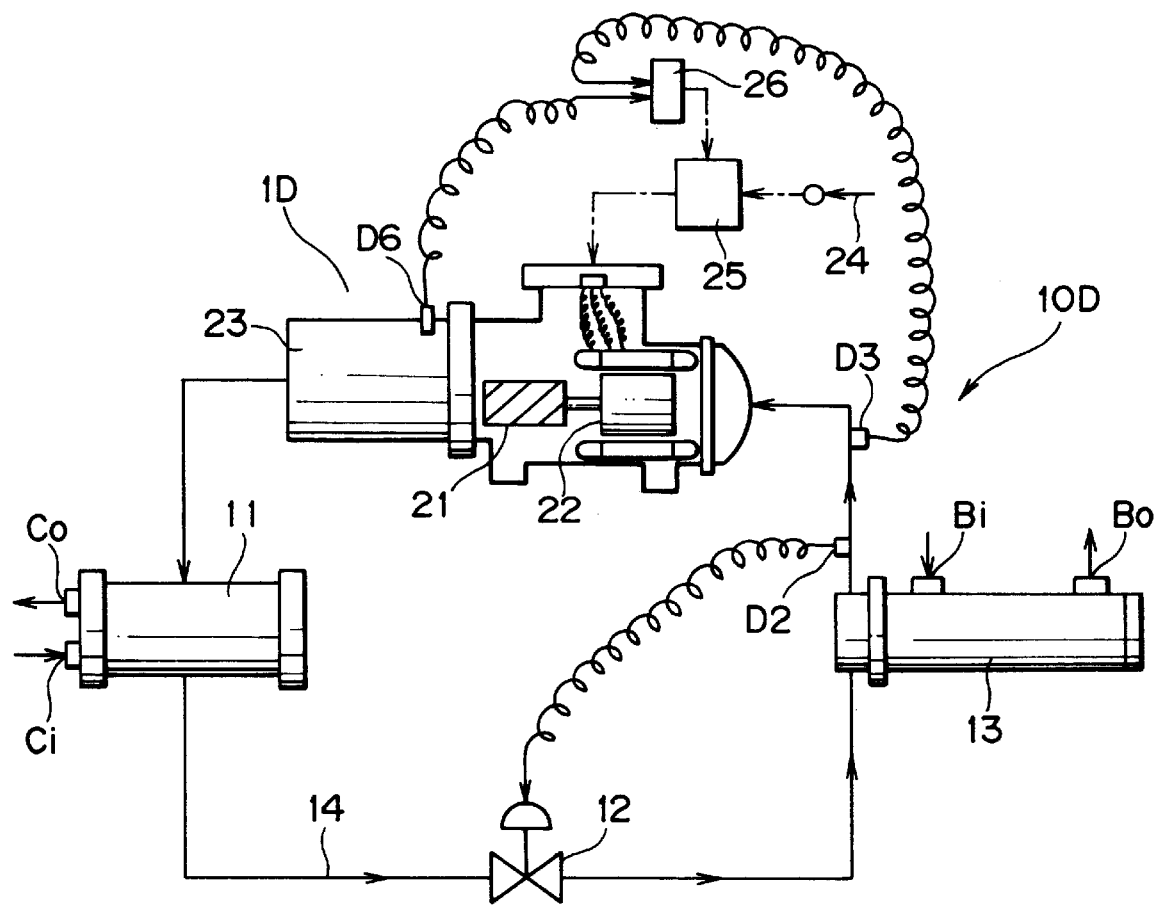
FIG. 7 schematically shows a refrigerating apparatus incorporating yet another screw compressor according to the present invention.

FIG. 7 shows a refrigerating apparatus 10D incorporating still another screw compressor 1D according to the present invention, in which drawing the constituents of the screw compressor 10A common to those of the refrigerating apparatus shown in FIG. 1 are indicated with same reference numerals and descriptions thereof will be omitted.

The refrigerating apparatus 10D is provided with a discharge temperature detector D6 for detecting the temperature of refrigerant gas compressed and discharged from the screw rotors 21 in the discharging portion 23 instead of the motor coil temperature detector D1 shown in FIG. 1, so that a temperature signal indicating the detected temperature is inputted from the discharge temperature detector D6 into the controller 26.

Figure 8:
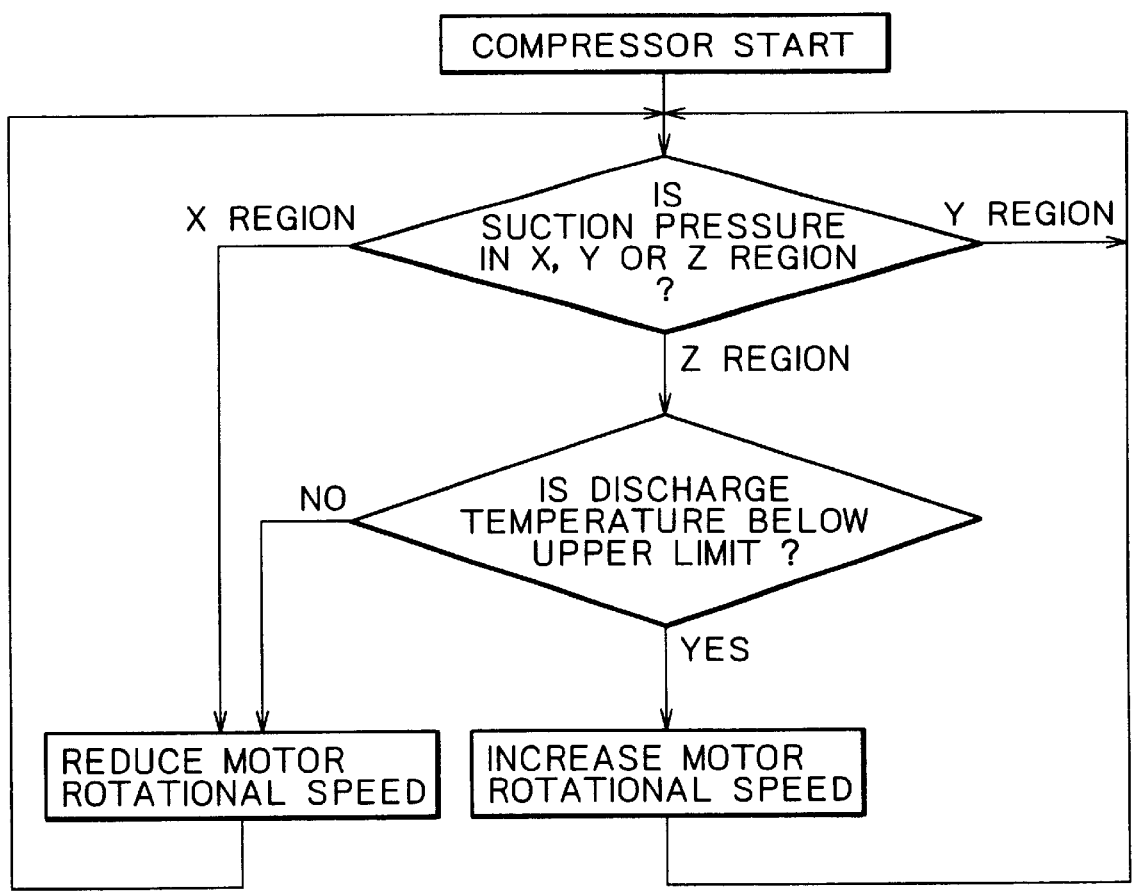
FIG. 8 is a flow chart illustrating the control of the screw compressor in the refrigerating apparatus shown in FIG. 7.

And, in this refrigerating apparatus, as shown in FIG. 8, a control is performed in which a step for determining whether the discharge temperature of the compressed refrigerant gas from the screw rotors 21 is below the predetermined upper limit value (YES), or not (NO) is included instead of the step for determining whether the motor coil temperature is below the upper limit value or not as shown in FIG. 3. Namely, if the discharge temperature is below the upper limit value (YES), it passes to the step for increasing the rotational speed of the motor, because the motor 22 is considered as not in the overload condition, and if the discharge temperature is not below the upper limit value (NO), it passes to the step for reducing the rotational speed of the motor, because the motor 22 is considered as in the overload condition.

This control is substantially identical to that shown in FIG. 3, except that the overload condition of the motor 22 is determined based on the discharge temperature.

Figure 9:
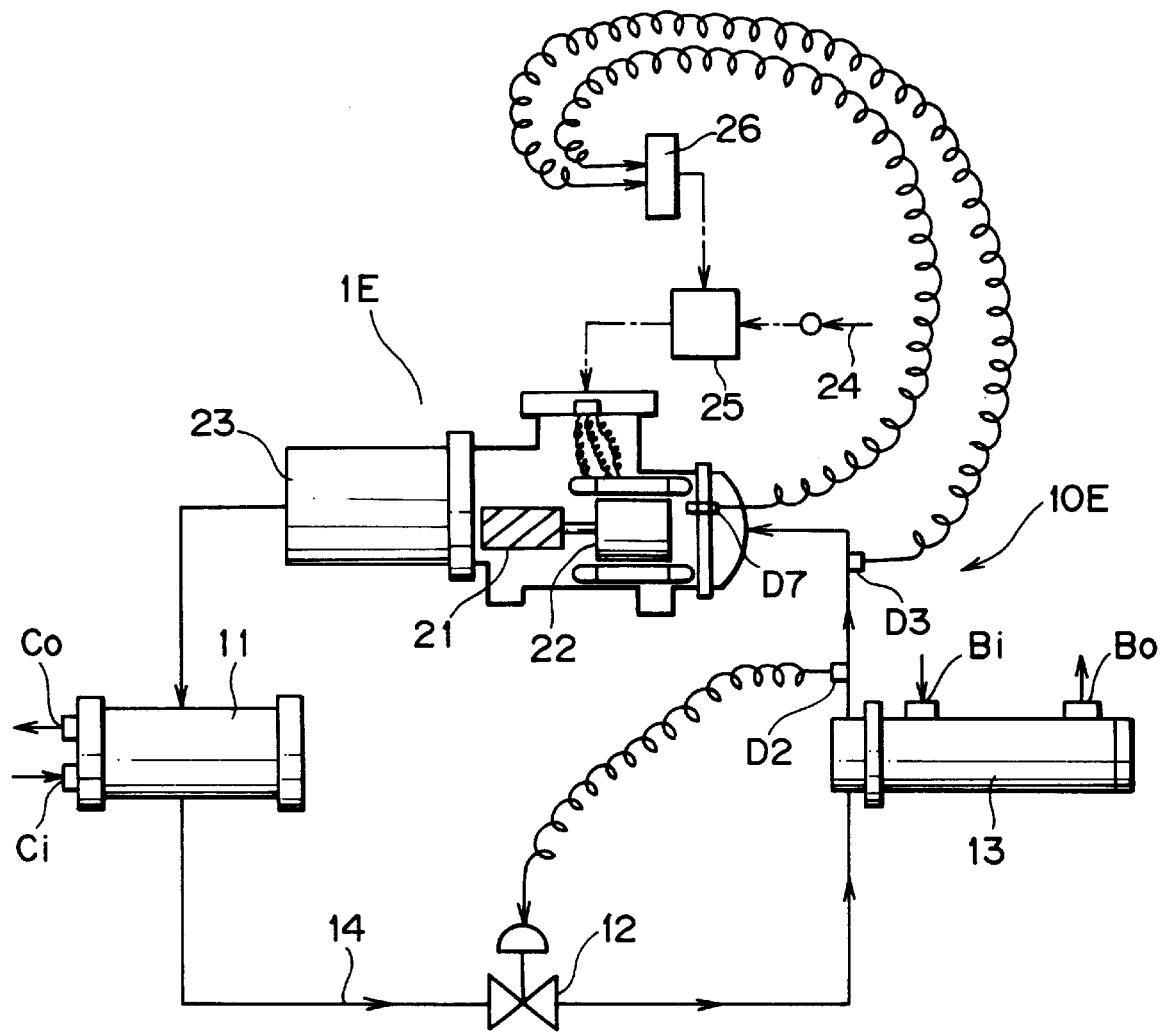
FIG. 9 schematically shows a refrigerating apparatus incorporating yet another screw compressor according to the present invention.

FIG. 9 shows a refrigerating apparatus 10E incorporating still another screw compressor 1E according to the present invention, in which drawing the constituents of the screw compressor 10E common to those of the refrigerating apparatus 10A shown in FIG. 1 are indicated with same reference numerals and descriptions thereof will be omitted.

The refrigerating apparatus 10E is provided with a motor rotational speed detector D7 for detecting the rotational speed of the motor 22 instead of the motor coil temperature detector D1 shown in FIG. 1, so that a rotational speed signal indicating the detected rotational speed is inputted from the motor rotational speed detector D7 into the controller 26.

Figure 10:
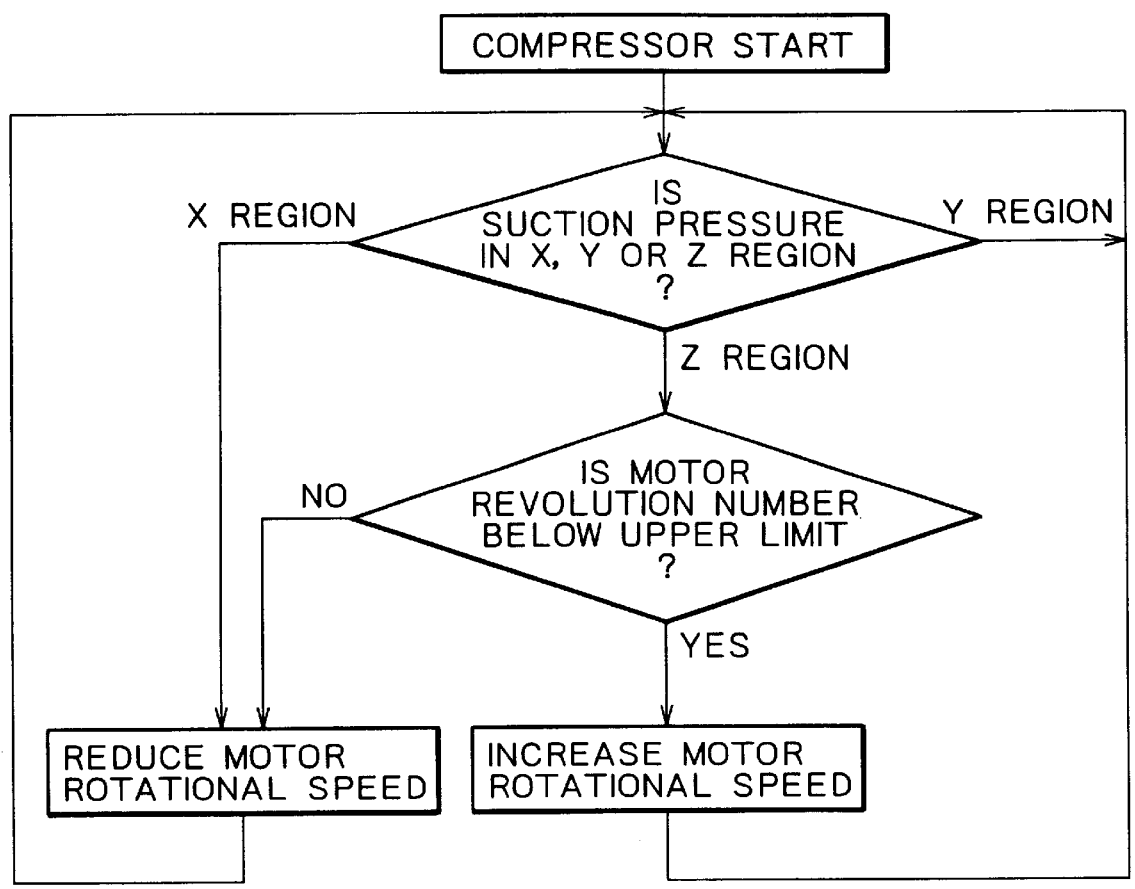
FIG. 10 is a flow chart illustrating the control of the screw compressor in the refrigerating apparatus shown in FIG. 9.

And, in this refrigerating apparatus, as shown in FIG. 10, a control is performed in which a step for determining whether the rotational speed of the motor is below the predetermined upper limit value (YES) or not (NO) is included instead of the step for determining whether the motor coil temperature is below the predetermined upper limit value or not as shown in FIG. 3. Namely, if the rotational speed of the motor is below the upper limit value (YES), it passes to the step for increasing the rotational speed of the motor because the motor 22 is considered as not in the overload condition, and if the rotational speed of the motor is not below the upper limit value (NO), the step passes to the step for reducing the rotational speed of the motor because the motor 22 is considered as in the overload condition.

This control is substantially identical to that shown in FIG. 3, except that the overload condition of the motor 22 is determined based on said rotational speed of the motor.

Furthermore, because it is also possible to know the rotational speed of the motor from the frequency of electric current outputted from the inverter 25, a frequency detector D7 for detecting the frequency may be provided on the inverter 25 or its secondary side instead of the motor rotational speed detector D7, so that a frequency signal indicating the magnitude of detected frequency is inputted from the frequency detector D7 into the controller 26. In this case, a step for determining whether the frequency is below the predetermined upper limit value or not is included instead of the step for determining the magnitude of rotational speed of the motor in FIG. 10.

Each of the refrigerating apparatus described in the above is provided with only one type of detectors among the motor coil temperature detector D1, the cooled liquid temperature detector D4, the current detector D5 and the like in order to determine the load condition of the motor 22. However, the present invention is not limited to a certain type of detectors, and covers refrigerating apparatus provided with two or more detectors suitably selected from these detectors. Selected detectors may include all or some of the detectors described in the above to determine the load condition of the motor 22 and the combination thereof is optional.

Next, refrigerating apparatus using two types, three types, and four types of detectors, respectively, for determining the load condition of the motor 22 will be described as an example. Of course, the present invention is not limited to illustrated combinations.

Figure 11:
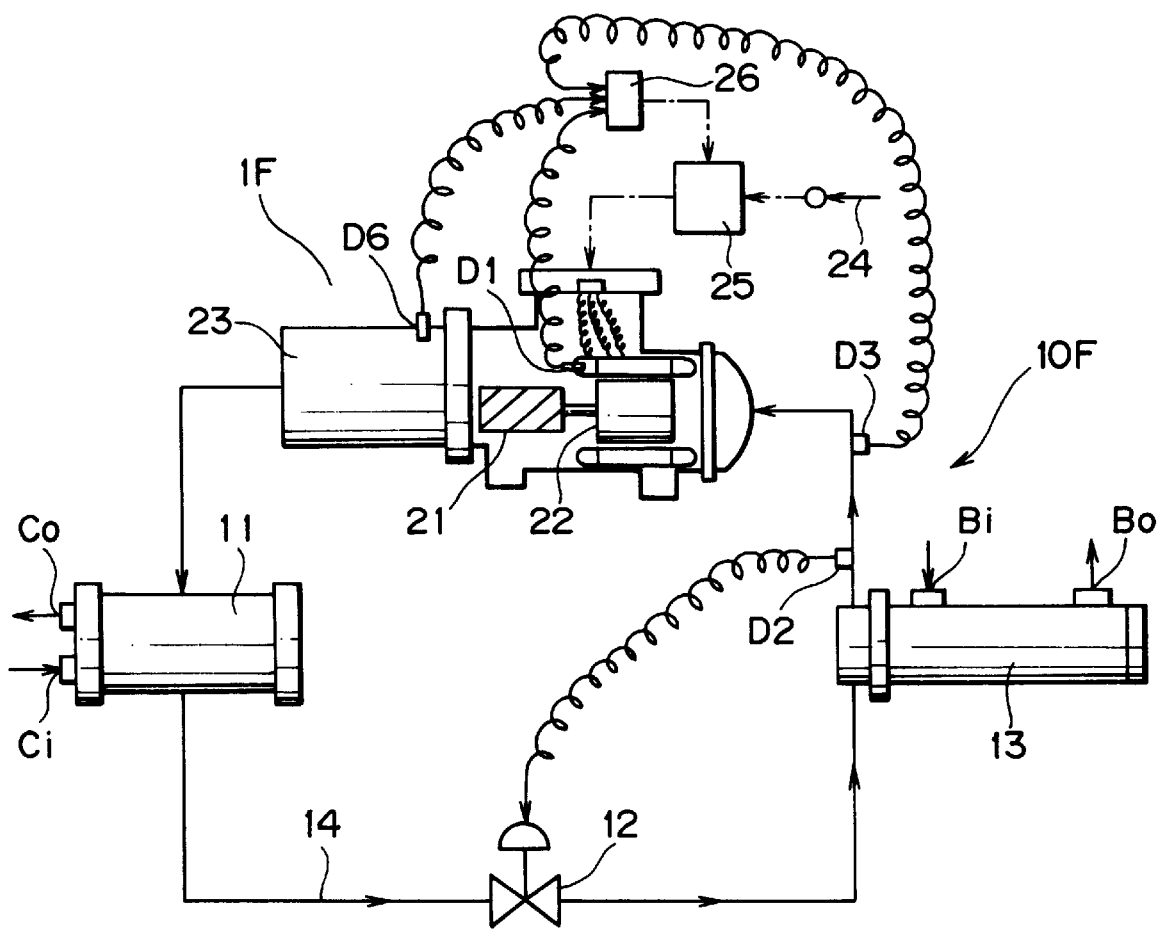
FIG. 11 schematically shows a refrigerating apparatus incorporating yet another screw compressor according to the present invention.

FIG. 11 shows a refrigerating apparatus 10F to which a screw compressor 1F provided with the motor coil temperature detector D1 and the discharge temperature detector D6, in which drawing the constituents common to those of the refrigerating apparatus explained in the above are indicated with same reference numerals and descriptions thereof will be omitted.

Figure 12:
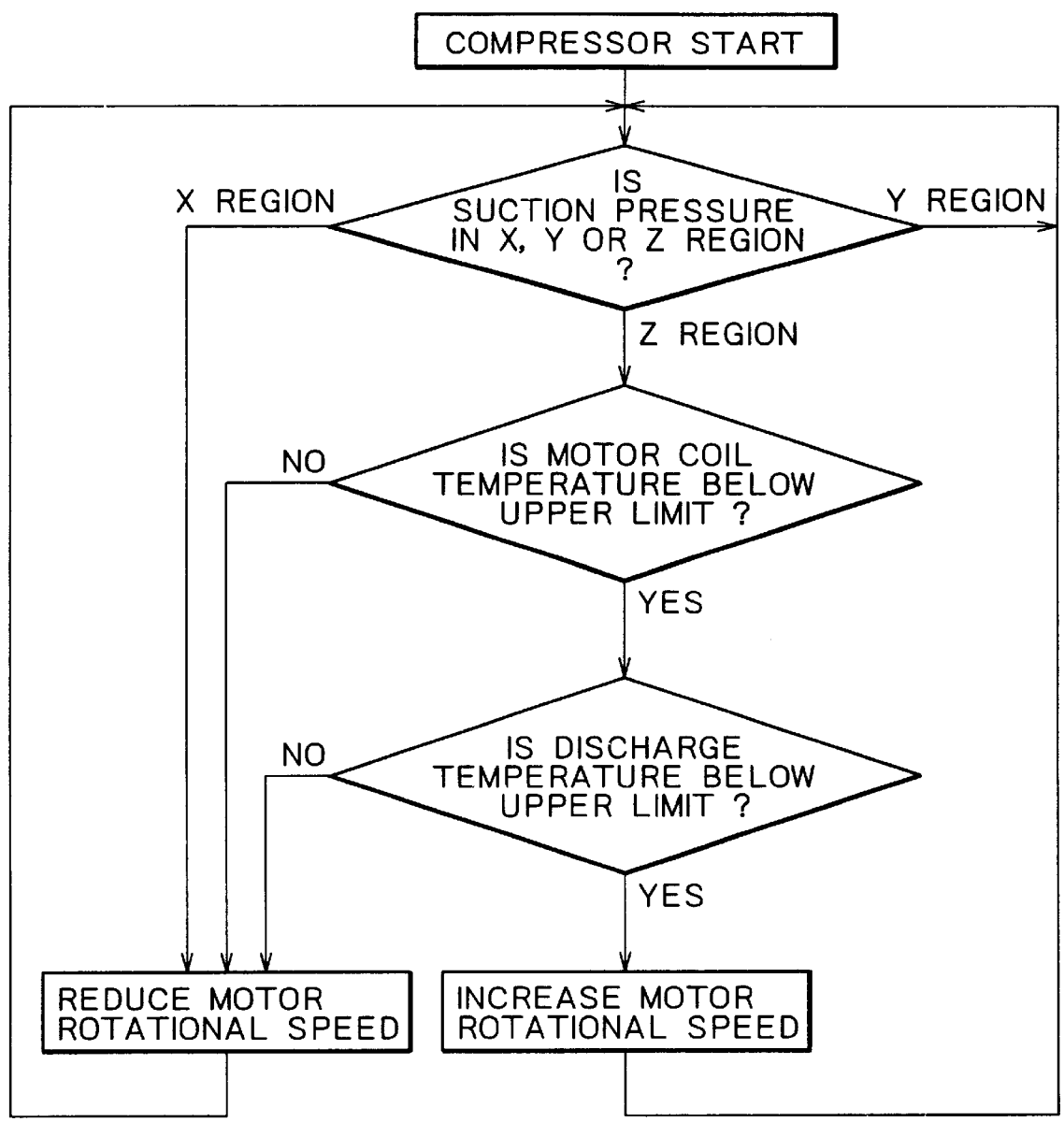
FIG. 12 is a flow chart illustrating the control of the screw compressor in the refrigerating apparatus shown in FIG. 11.

In the refrigerating apparatus 10F, as shown in FIG. 12, the determination as to where a suction pressure belongs among X, Y and Z regions is made; if it is determined that it belongs to Z region, two steps for determining signals from two detectors are interposed before arriving at the step for increasing the rotational speed of the motor. Namely, if it is determined that the suction pressure belongs to Z region, the process passes to the step for determining whether the motor coil temperature is below the predetermined upper limit value (YES) or not (NO). If NO, the process passes to the step for reducing the rotational speed of the motor because the motor is considered as in the overload condition. If YES, the process passes to the step for determining whether the discharge temperature is below the upper limit value (YES) or not (NO), because it can not be considered that the motor 22 is in the overload condition merely based on the motor coil temperature. If NO, the process passes to the step for reducing the rotational speed of the motor because the motor 22 is considered as in the overload condition, and if YES, the process passes to the step for increasing the rotational speed of the motor because the motor 22 is considered as not in the overload condition. The control flow thereafter is identical to those described in the above.

Like this, in the refrigerating apparatus 10F, the determination as to whether the motor 22 is in the overload condition or not is doubly made based on two factors.

Furthermore, the order of two determination steps as to the motor coil temperature detector D1 and the discharge temperature detector D6 is optional rather than limited thereto.

Figure 13:
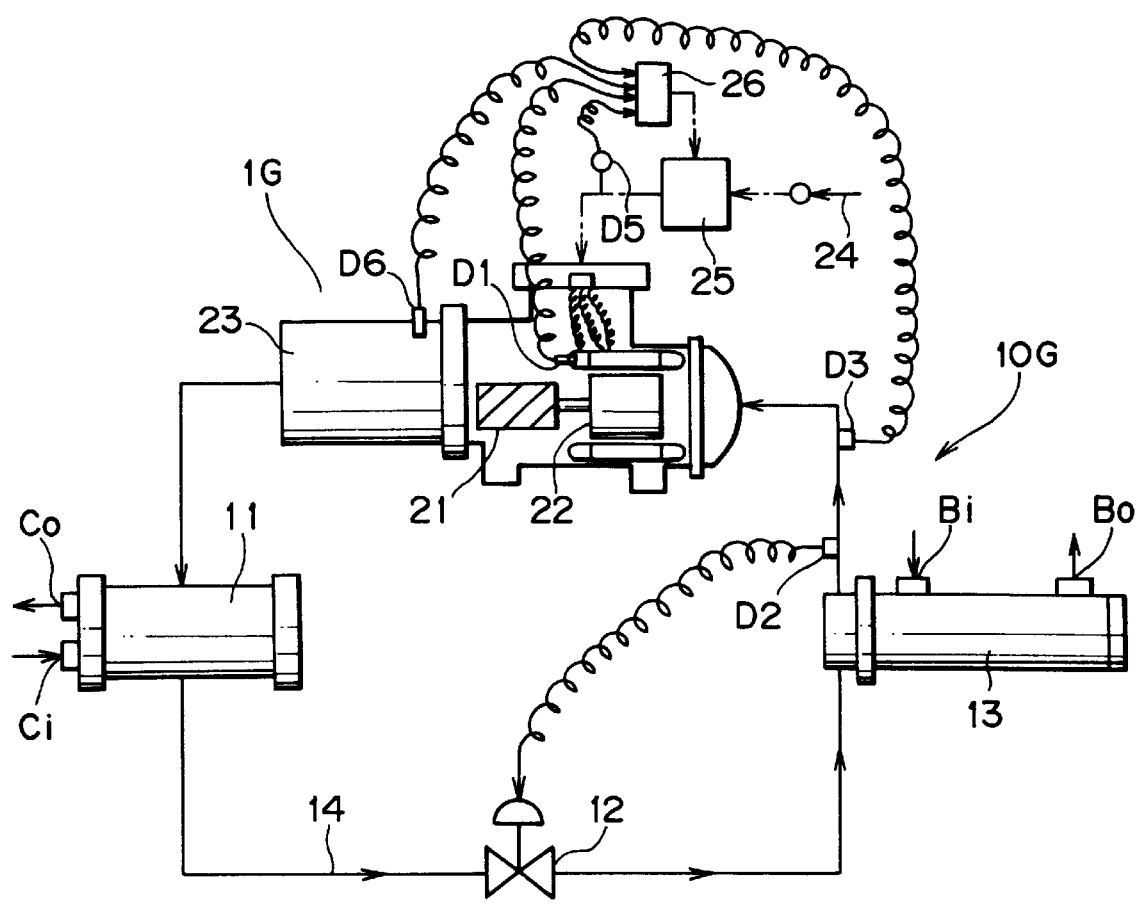
FIG. 13 schematically shows a refrigerating apparatus incorporating yet another screw compressor according to the present invention.

FIG. 13 shows a refrigerating apparatus 10G incorporating a screw compressor 1G additionally provided with the current detector D5 in addition to the motor coil temperature detector D1 and the discharge temperature detector D6, in which drawing the constituents common to those of the refrigerating apparatus explained in the above are indicated with same reference numerals and descriptions thereof will be omitted.

Figure 14:
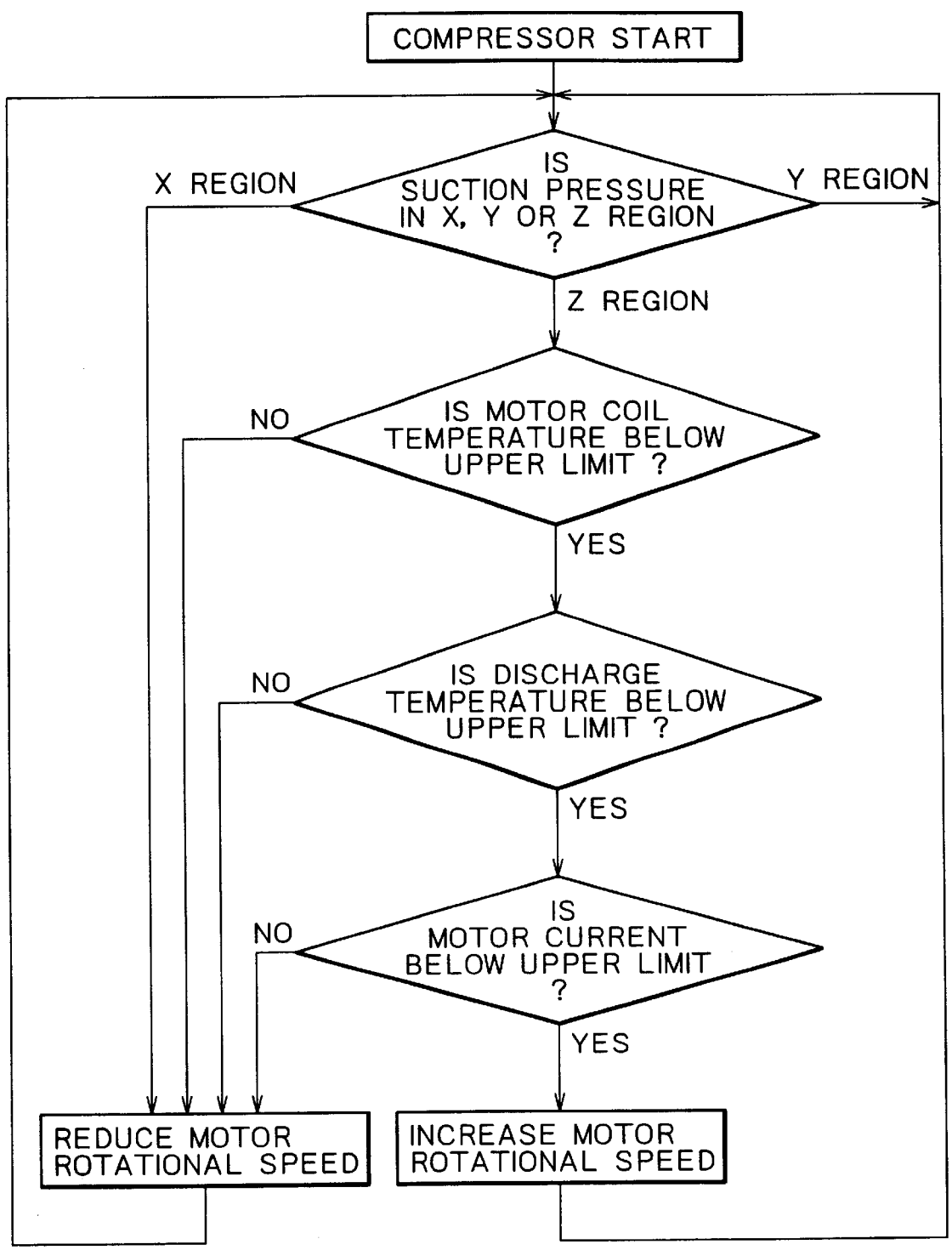
FIG. 14 is a flow chart illustrating the control of the screw compressor in the refrigerating apparatus shown in FIG. 13.

As shown in FIG. 14, in this refrigerating apparatus 10G, a step for determining whether the motor current is below the upper limit value (YES) or not (NO) is added to the control flow chart thereof in addition to the flow chart shown in FIG. 13.

And, in this refrigerating 10G, the determination as to whether the motor 22 is in the overload condition or not is trebly made based on three factors.

Furthermore, the order of three determination steps as to the motor coil temperature detector D1, the discharge temperature detector D6 and the current detector D5 is optional rather than limited thereto.

Figure 15:
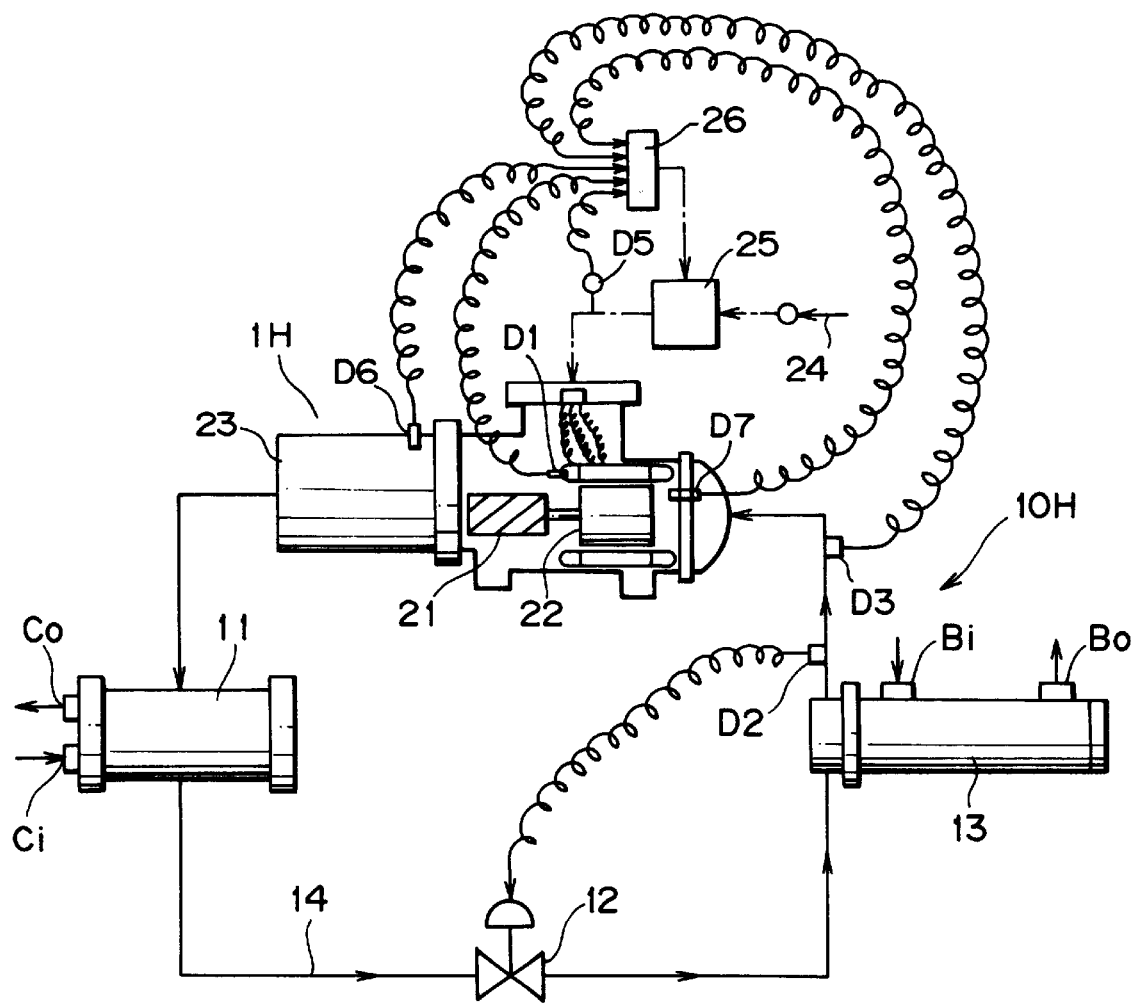
FIG. 15 schematically shows a refrigerating apparatus incorporating yet another screw compressor according to the present invention.

FIG. 15 shows a refrigerating apparatus 10H incorporating a screw compressor 1H additionally provided with the motor rotational speed detector D7 in addition to the motor coil temperature detector D1, the discharge temperature detector D6, and the current detector D5, in which drawing the constituents common to those of the refrigerating apparatus explained in the above are indicated with same reference numerals and descriptions thereof will be omitted.

As shown in FIG. 16, in this refrigerating apparatus 10H, a step for determining whether the rotational speed of the motor is below the upper limit value (YES) or not (NO) is added in the control flow chart in addition to the flow chart shown in FIG. 14.

And, in this refrigerating apparatus 10H, the determination as to whether the motor 22 is in the overload condition or not is fourfold made based on four factors.

Furthermore, the order of four determination steps as to the motor coil temperature detector D1, the discharge temperature detector D6, the current detector D5 and the motor rotational speed detector D7 is optional rather than limited thereto.

In each refrigerating apparatus shown in FIG. 5 and the drawings thereafter, the cooled liquid temperature detector D4 may be provided instead the suction pressure detector D3. In this case, the suction temperature is introduced based on the temperature signal from the cooled liquid temperature detector D4 and then the determination as to where the suction pressure belongs among X, Y and Z regions is made in the control flow.

What is claimed is:

1. A screw compressor for refrigerating apparatus comprising:
    a screw rotor;
    a motor for driving said screw rotor, the rotational speed of said motor being controlled through an inverter;
    a heat load detecting means for detecting the cooling heat load;
    a load condition detecting means for detecting the load condition of said motor; and
    a motor rotational speed controlling device for controlling the rotational speed of said motor based on a heat load signal from said heat load detecting means and a load condition signal from said load condition detecting means.

2. The screw compressor for refrigerating apparatus as claimed in claim 1, wherein said motor rotational speed controlling device controls to reduce the rotational speed of said motor if the compressor capacity is determined as excessive based on said heat load signal or if the load condition of said motor is determined as excessive based on said load condition signal, and increase the rotational speed of said motor if the compressor capacity is determined as lacking based on said heat load signal and the load condition of said motor is determined as not excessive based on said load condition signal.

3. The screw compressor for refrigerating apparatus as claimed in claim 1, wherein said head load detecting means is a detector for detecting the suction pressure of said screw compressor.

4. The screw compressor for refrigerating apparatus as claimed in claim 1, wherein said heat load detecting means is a detector for detecting the temperature of cooled liquid emanated from an evaporator of said refrigerating apparatus.

5. The screw compressor for refrigerating apparatus as claimed in claim 1, wherein said load condition detecting means is a detector for detecting the coil temperature of said motor.

6. The screw compressor for refrigerating apparatus as claimed in claim 1, wherein said load condition detecting means is a detector for detecting the electric current supplied to said motor.

7. The screw compressor for refrigerating apparatus as claimed in claim 1, wherein said load condition detecting means is a detector for detecting the temperature of refrigerant gas discharged from said screw compressor.

8. The screw compressor for refrigerating apparatus as claimed in claim 1, wherein said load condition detecting means is a detector for detecting the rotational speed of said motor.

9. The screw compressor for refrigerating apparatus as claimed in claim 1, wherein said screw compressor has two or more said load condition detecting means and performs the control of rotational speed of said motor based on two or more said load condition signals.

10. The screw compressor for refrigerating apparatus as claimed in claim 9, wherein said motor rotational speed controlling device is controlled to reduce the rotational speed of said motor if the compressor capacity is determined as excessive based on said heat load signal or if the load condition of said motor is determined as excessive based on at least one among said two or more load condition signals, and increases the rotational speed of said motor if the compressor capacity is determined as lacking based on said heat load signal and if the load condition of said motor is determined as not excessive from all of said two or more load condition signals.

11. The screw compressor for refrigerating apparatus as claimed in claim 9, wherein said two or more load condition detecting means comprises two or more detectors selected from the following:
- a detector for detecting the coil temperature of said motor;
- a detector for detecting the electric current supplied to said motor;
- a detector for detecting the temperature of refrigerant gas discharged from said screw compressor; and
- a detector for detecting the rotational speed of said motor.

* * * * *